US007620722B1

(12) United States Patent
Ruparel (10) Patent No.: US 7,620,722 B1
(45) Date of Patent: Nov. 17, 2009

(54) METHOD AND APPARATUS FOR ESTABLISHING COMMUNICATION

(75) Inventor: Ketan Ruparel, Luton (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 632 days.

(21) Appl. No.: 10/069,685

(22) PCT Filed: Jun. 20, 2000
(Under 37 CFR 1.47)

(86) PCT No.: PCT/EP00/05709
§ 371 (c)(1),
(2), (4) Date: Mar. 5, 2003

(87) PCT Pub. No.: WO01/17215
PCT Pub. Date: Mar. 8, 2001

(30) Foreign Application Priority Data
Aug. 31, 1999 (EP) .................... 99306916

(51) Int. Cl.
*G06F 13/00* (2006.01)
(52) U.S. Cl. .................... 709/227; 709/228; 709/224
(58) Field of Classification Search ................ 709/206, 709/207, 224, 227–229, 215, 203; 379/266.01, 379/266.02, 265.09; 434/350
See application file for complete search history.

(56) References Cited
U.S. PATENT DOCUMENTS

| 5,727,950 A * | 3/1998 | Cook et al. ................ 434/350 |
| 5,815,662 A * | 9/1998 | Ong ............................ 725/92 |
| 6,029,175 A * | 2/2000 | Chow et al. ............. 707/104.1 |
| 6,044,146 A * | 3/2000 | Gisby et al. ............ 379/266.02 |
| 6,233,332 B1 * | 5/2001 | Anderson et al. ...... 379/265.09 |
| 6,304,906 B1 * | 10/2001 | Bhatti et al. ................ 709/227 |
| 6,434,230 B1 * | 8/2002 | Gabriel .................. 379/265.01 |
| 6,505,250 B2 * | 1/2003 | Freund et al. .............. 709/226 |
| 6,606,668 B1 * | 8/2003 | MeLampy et al. .......... 709/241 |
| 7,003,628 B1 * | 2/2006 | Wiedenman et al. ........ 711/118 |
| 7,299,468 B2 * | 11/2007 | Casey et al. ................ 718/104 |

FOREIGN PATENT DOCUMENTS

| CA | 2178705 | 6/1996 |
| EP | 735482 A1 * | 10/1996 |
| EP | 0866407 A1 | 9/1998 |
| EP | 0 909 082 A1 | 4/1999 |
| WO | WO 98 13765 A | 4/1998 |
| WO | WO 99/12100 | 3/1999 |
| WO | WO 99/41720 | 8/1999 |

* cited by examiner

*Primary Examiner*—Kenneth R Coulter
(74) *Attorney, Agent, or Firm*—Martin I. Finston (57) ABSTRACT

A method of establishing communication between an information source defined by a data processing system and a user accessing the information source with a data processing device via a communications network is described. The method comprises assigning a position in a queue to the user according to one or more rules; determining contact information relating to the user which enables an agent to contact the user; and establishing communication between an agent and the user at the head of the queue using the contact information. The method is characterized in that at least one rule relates to the use of the information source by the user, and that the method further comprises monitoring the interaction of the user with the information source, one or more of the rules using the monitored interaction to assign a position in the queue to the user, wherein the information source is a Web server and the user accesses the information source using a Web browser.

16 Claims, 6 Drawing Sheets

| | RULE 1 | RULE 2 | RULE 3 | RULE 4 | RULE 5 | RULE 6 | RULE 7 |
|---|---|---|---|---|---|---|---|
| 200 — B1 107 | 45 | 25 | 2 | 0 | 15 | 20 | 0 |
| 201 — B2 42 | 10 | 2 | 5 | 10 | 5 | 10 | 0 |
| 202 — B3 32 | 0 | 12 | 0 | 0 | 20 | 0 | 0 |
| 203 — P1 25 | 0 | 0 | 0 | 0 | 15 | 10 | 0 |
| 204 — B4 21 | | | | | | | |
| 205 — B5 19 | | | | | | | |
| 206 — P2 16 | | | | | | | |
| 207 — P3 14 | 0 | 0 | 0 | 0 | 4 | 10 | 0 |
| 208 — P4 12 | | | | | | | |
| 209 — P5 11 | | | | | | | |

FIG. 4b

| | RULE 1 | RULE 2 | RULE 3 | RULE 4 | RULE 5 | RULE 6 | RULE 7 |
|---|---|---|---|---|---|---|---|
| 200 B2 57 | 10 | 2 | 5 | 10 | 15 | 20 | 0 |
| 201 P3 54 | 0 | 0 | 0 | 0 | 4 | 20 | 30 |
| 202 P1 40 | 0 | 0 | 0 | 0 | 20 | 20 | 0 |
| 203 B3 37 | 0 | 12 | 0 | 0 | 15 | 10 | 0 |
| 204 B4 31 | | | | | | | |
| 205 P2 26 | | | | | | | |
| 206 P4 24 | | | | | | | |
| 207 P5 21 | | | | | | | |

METHOD AND APPARATUS FOR ESTABLISHING COMMUNICATION

TECHNICAL FIELD

This invention relates to a method and apparatus for establishing communication between an agent representing an information source and a user accessing the information source.

BACKGROUND OF THE INVENTION

Methods of providing a remote user with information or services via a communications network are well established. For example airline tickets can be purchased by a customer over the telephone, the customer being connected to an agent of the airline who records the customer's details and arranges the payment of the airline for the tickets by asking for details printed upon the customer's credit card. The number of customers requesting information or services is frequently larger than the number of agents dealing with the requests and consequently it is common for the customers to be placed in a queue to await connection to an agent. The prioritizing of customers within a queue is often based upon a "first-come-first-served" system although other methods are known for example in telephone systems providing Direct Dialing In (DDI) facilities or those which use Calling Line Identity (CLI) information for queuing purposes.

Increasingly companies are providing similar services electronically via the Internet. In this case a user visiting a Web site can request communication with an agent for example by clicking on a "push-to-talk" button. Queuing of such requests is often required and the requests themselves may be in the form of e-mails or voice calls using the Internet link. The user can then communicate directly with the agent via the Internet.

Users held within a queue quickly grow impatient if they are made to wait for connection to an agent and consequently many users simply disconnect from the queue if they are made to wait for too long. The loss of a user from a queue represents a loss of potential sales to the user. Additionally, a company providing services over a communications network is often unaware of the relative potential value of particular users before contact with an agent has been established. The user may represent a large business and consequently the loss of potential sales in such a case can be considerable. Hence there is a desire to identify potentially valuable customers and place them in contact with an agent as quickly as possible.

SUMMARY OF THE INVENTION

In accordance with the present invention, we provide a method of establishing communication between an information source defined by a data processing system and a user accessing the information source with a data processing device via a communications network. The method comprises assigning a position in a queue to the user according to one or more rules; determining contact information relating to the user which enables an agent to contact the user; and establishing communication between an agent and the user at the head of the queue using the contact information. The invention is characterized in that at least one rule relates to the use of the information source by the user, and that the method further comprises monitoring the interaction of the user with the information source, one or more of the rules using the monitored interaction to assign a position in the queue to the user, wherein the information source is a Web server and the user accesses the information source using a Web browser.

The present invention provides a method of assessing the relative value of a user to the information source. Typically the information source might represent a company providing services over a communications network. By assessing the relative value of each user to the company, the company can prioritize the users, giving those of greater value a higher priority and accordingly, a position closer to the head of the queue. In addition, the system provides the agents with contact information relating to the users, enabling the agents to contact the users. Advantageously the system therefore not only attempts to establish which users are the most important to the company but also allows agents to initiate contact with these users. In many cases the users accessing the information source will be unaware that they are being assessed and placed in a queue accordingly.

The rules used in assigning a user to a position in the queue may require additional information before a position can be assigned. The information may be related to the use of the information source by the user or to information about the user. In either case this information may be related to access of the information source by the user either currently or on one or more previous occasions. Typically this information will be either obtained from the user or derived by monitoring the user's activity in accessing the information source. This information can be derived by a number of methods.

If information is required from the user then a registration procedure can be implemented in which the user is required to enter the required information. Typically this information will be required prior to the user being allowed access to the information source. Alternatively registration could be required during access of the information source, for example to access specific information or after a specified period. Typical examples of the information required include the user's name, address, telephone number, e-mail address and company details. Preferably these data can be stored in a user database which is updated with information relating to how often the user accesses the information source, and the particular information accessed. Access of the information source by the user at a later date preferably requires identification of the user which can be achieved for example by using a selected password.

Another method which can be used is the transfer of instructions from the data processing system of the information source to the data processing device of the user. The data instruct the data processing device to send information back to the information source. In the case of an Internet based system, preferably the information source comprises a Web server and preferably the user accesses the information source with a data processing device such as a computer running Web browser software. In a Web-based system, these instructions can take the form of an "applet". Alternatively, the information itself can be passed between the Web server and the Web browser as a "cookie".

Within this description a "cookie" is defined as any data containing information for use by a Web browser or Web server that are transferred to a Web browser from a server and which stay resident upon the user's computer and can be passed back to the server when the browser accesses the Web server in the future. Cookies in this example do not contain executable instructions.

An "applet" is defined here as a unit of executable software or interpreted code that is downloaded from a Web server to a Web browser as part of a Web page. Applets can be used to visibly enhance the Web page; to interactively or non-interactively gather information about the user, the user's Web browser or the user's computer; and to enable extra communication streams between the Web server software and the user's browser or computer. Typically information is sent back to the server periodically or on demand.

Some types of information for use as an input to one or more of the queuing rules can be acquired by software running on the Web server or via interaction with a third party application. Information relating to the interaction of the user with the information source can be obtained in this way. In an electronic commerce system an example of a third party application is Microsoft SiteServer 3.0 Commerce Edition.

Typically the information monitored or received is used as an input to one of the queue assignment rules and includes one or more of, the time spent by the user accessing the information source, how frequently the user has accessed the information source, the identity of the user and the specific information accessed by the user.

As the number and activities of users within the queue will change over a period of time, preferably the positions of the users in the queue will be reevaluated to ensure that the queue is maintained in a correctly ordered manner. Preferably the use of the information source by the users will be monitored and the queue will be reordered correctly in accordance with the rules. This may be achieved by regularly assessing each user in the queue and reassigning positions in the queue accordingly. Alternatively the reassessment of a user's position may only be effected in response to a change in the activities of a user or due to the addition or removal of a user from the queue.

In principle any network providing two-way communications can be used with the present invention but preferably the network comprises a Wide Area Network (WAN), a Local Area Network (LAN), a Public Switched Telephone Network (PSTN), an intranet, an extranet or the Internet.

Contact between the agent and the user in response to the user reaching the head of the queue need not be via the same communication network that is used by the user to access the information source. The contact information typically includes at least one of a PSTN address, a WAN address, a LAN address, an e-mail address or a TCP/IP address.

In a Web-based system, the contact information may be requested as part of the information required for the user to register with the information source. Alternatively this may be provided by an applet which interrogates the user's computer and Web browser to establish any possible additional methods or a preferred method of communication between the agent and the user.

Preferably a user reaching the head of the queue will be passed to an appropriate agent. The agent may have skills matching the assessed interests of the user or may have been in contact with the user on a previous occasion. Preferably the agent will use the contact information to contact the user whilst the user continues to access the information source.

Examples of typical information required as an input to one or more of the rules are now described.

1. The Length of Time Visiting a Web Site:

This is calculated either by an applet or by software running on the Web server monitoring HTTP connection activity from the user's TCP/IP address. The time can be calculated as the time that has elapsed between initiating and terminating access to the information source or, if the user remains connected, the elapsed time since the user initiated access.

2. The Length of Time Visiting a Web Page:

This can similarly be calculated with an applet or software running on the Web server computer.

3. The Number of Times a User Returns to a Web Site:

This information can be stored and updated via a cookie sent to the user's computer or updated via user registration on the Web site.

4. The Number of Times a User Returns to a Web Page

This can be stored and updated via a cookie sent to the user's computer or via software running on the Web server monitoring the user's HTTP connection activity.

When the Web site is involved with commercial activities for the sale of products over the Web some additional rules may be used which may require further information including:

5. The Value of Goods in the User's "Virtual Shopping Basket" or Displayed on the Current Web Page.

The value of the goods is calculated by software running on the Web server or via interaction with a third party application. In this case the "virtual shopping basket" comprises a list of items that the user has indicated an intent to purchase.

DETAILED DESCRIPTION

Figure 1:
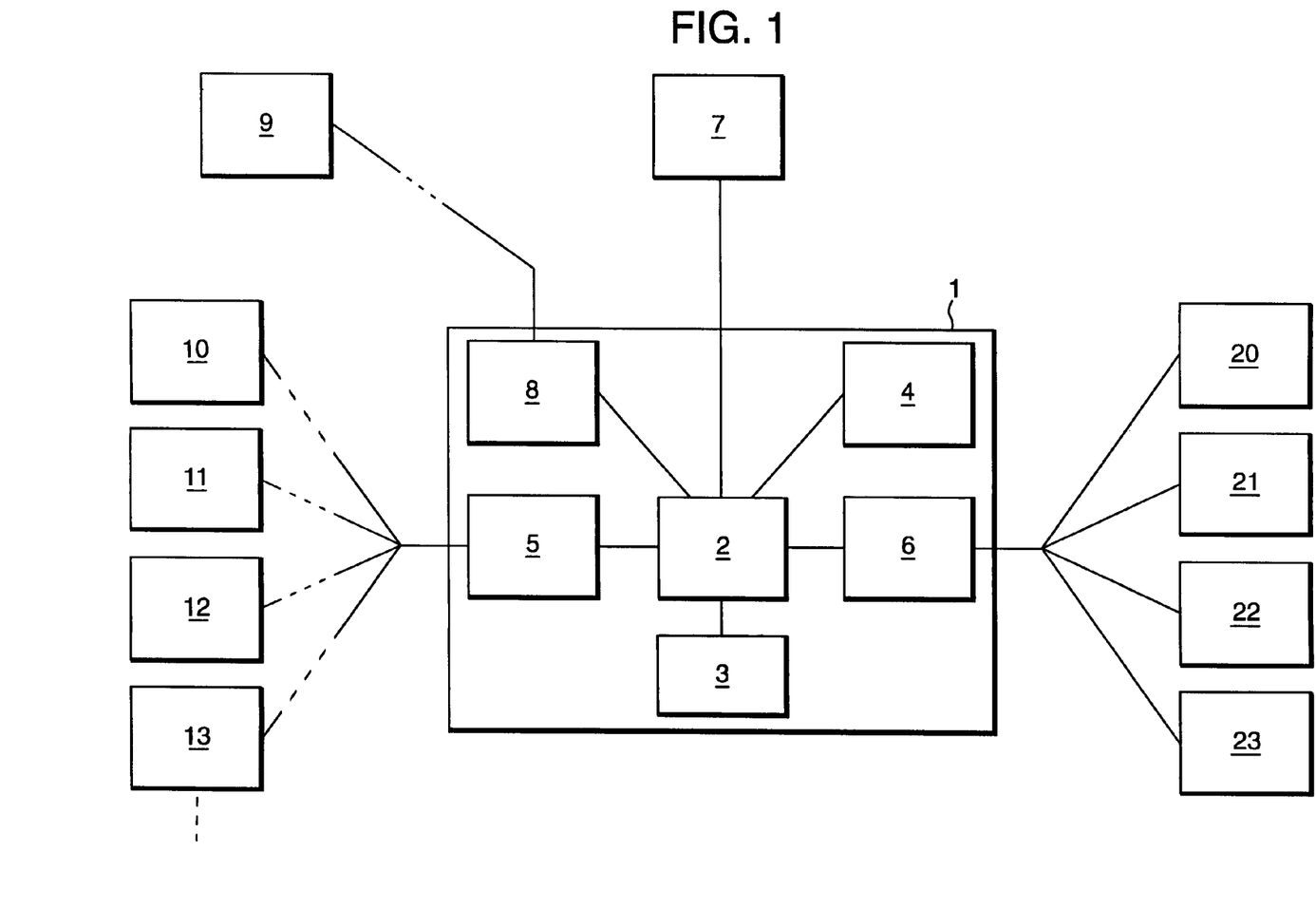
FIG. 1 is a schematic layout of the system according to a first example.

FIG. 1 illustrates an Internet based system according to the present invention. An information source comprises a computer 1 having a CPU 2 connected to a conventional data storage means 3 such as a hard disk and a conventional memory means 4 such as integrated circuit based RAM. The computer is connected to a plurality of other computers 10, 11, 12, 13, etc. over the Internet via a user communication means 5 such as a modem or a router which uses an Internet standard protocol such as TCP/IP. User communication means 5 is capable of simultaneous communication with a plurality of computers on the Internet as is well known in the art.

Computer 1 also contains an agent connection means 6 for connection with computers 20-23 operated by company agents. It will be appreciated that the communication means 5 and agent connection means 6 could be incorporated into a single device. Computer 1 is also connected to a central company computer 7 such as a mainframe which contains detailed records of customers' accounts and sales information. The computer 1 can also contact external computers using external contact means 8. Similarly the external contact means 8 could be incorporated into the user communication means 5 or the agent connection means 6. The agents' computers 20-23 also have access to the central computer 7 through their connection to the computer 1. The operating system of the information source computer 1 preferably operates in a multi-tasking environment.

The computers represented by numerals 10-13 typically comprise individual desktop or personal computers running Web browser software allowing connection to the information source Web site via the World-Wide-Web.

The computer 1 operates Web server software to run a Web site in a multi-tasking environment in addition to software to maintain a queuing system for contact by the company agents and further software to contact the user on behalf of an agent.

In a first example using the system shown in FIG. 1, computer 10 represents a personal computer running at a company office. The user is an information technology manager browsing the world-wide-Web to purchase a number of computers for his company over the Internet using a Web browser. The computer 12 is operated by a private user from home, connected to the Internet using a dial-up connection to an Internet Service Provider.

The Web server software running on computer 1, provides the presence on the world-wide-Web of a computer hardware supply company.

Figure 2:
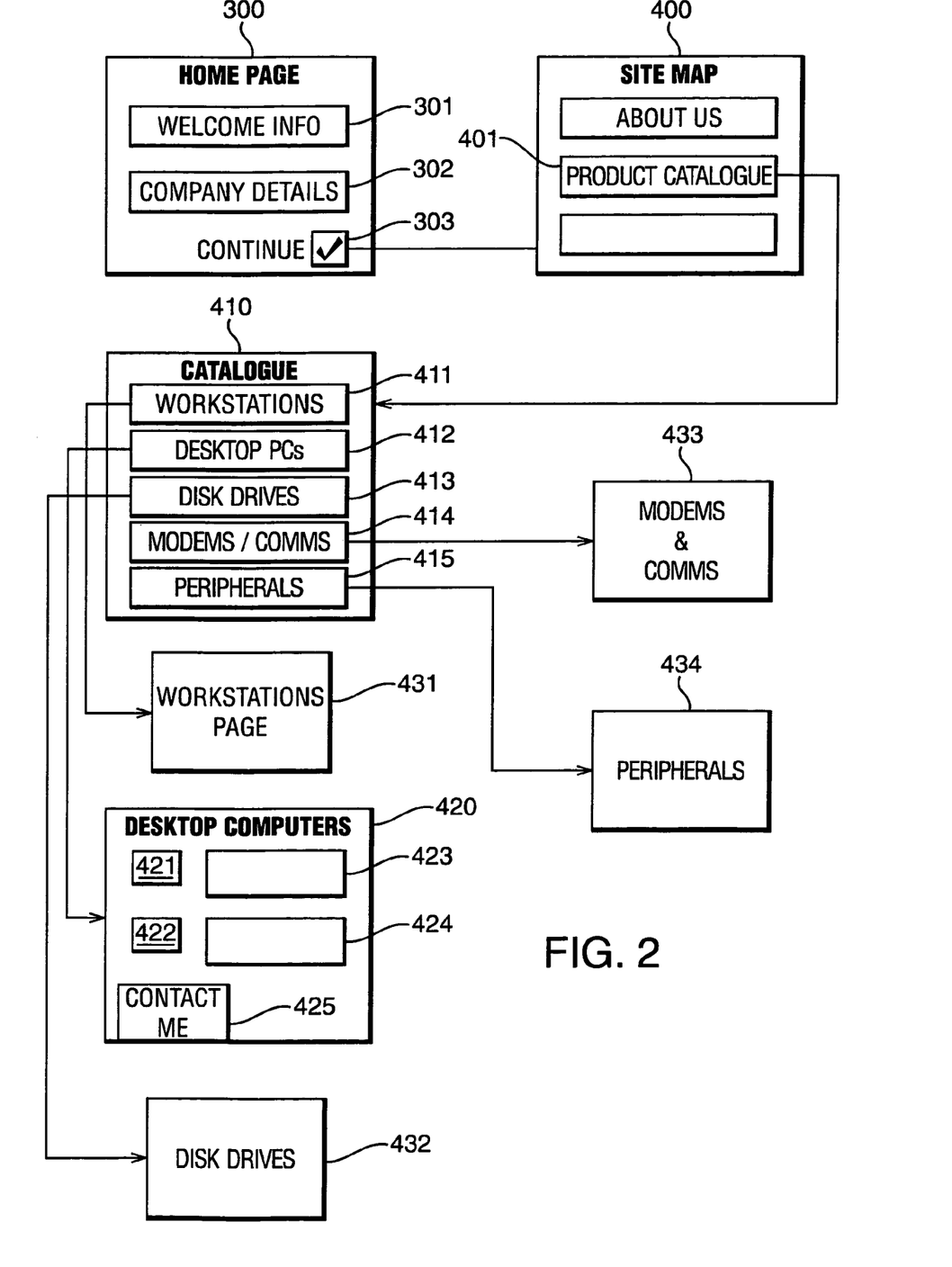
FIG. 2 is a representation of Web pages presented to the user in accordance with the first example.

On accessing the company's homepage 300 in a conventional manner, all users are provided with welcoming information 301 and a description of the company 302, as shown in FIG. 2. As is conventional, the user is required to indicate a desire to select one or more icons to access other Web pages on the Web site. In this case this is achieved by clicking upon a tick icon 303.

The homepage 300 of the present example acts as a filter for accidental access in that only interested users will continue to proceed further. If the user chooses to proceed then he is presented with a "site map" Web page 400 shown in FIG. 2. Accessing the site map 400 initiates the user assessment procedure shown in FIG. 3.

The site map 400 provides access to further Web pages including those relating to products which are accessed through the "Product Catalogue" indicator 401. Accessing the product catalogue displays a summary page 410 offering further product information in a number of categories. From the summary page 410 further pages relating to specific product types can be accessed. The choices are workstations 411, desktop computers 412, disk drives 413, modems and communication 414 and peripherals 415.

Accessing the desktop computers icon displays the desktop computers page 420. Other pages relating to the other choices are represented by numerals 431 to 434, showing 2 computers 421 and 422 with associated descriptions 423 and 424. The page also contains a "contact me" icon 425, the access of which increases the user's priority in the queue for service.

Figure 3:
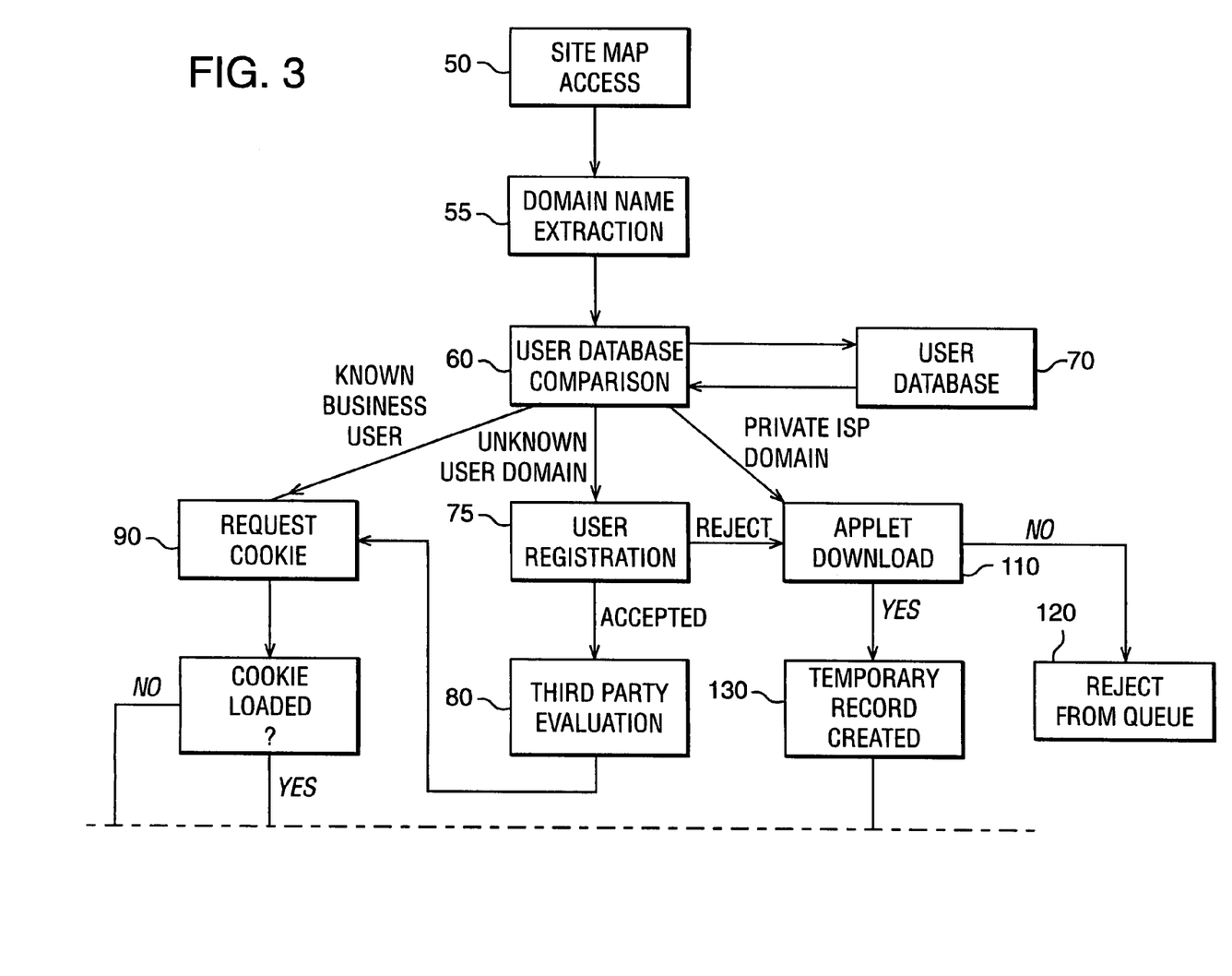
FIG. 3 is a flow diagram showing how a user is handled on contacting the system.

Referring to FIG. 3, following access of the site map at step 50, a domain identification procedure 55 is performed. In this procedure the computer 1, derives the domain name of the user's computer, for example using a "reverse lookup" procedure on the user's IP address, as is known to those skilled in the art.

Having obtained the domain name of the user's computer, the computer 1 then attempts to identify whether the user represents a known customer at step 60. This is achieved by comparing the domain name with a list of domain names held in a database 70. Database 70 is stored either on the hard disk 3 of computer 1 or alternatively on the central company computer 7, with which computer 1 can communicate. The database contains information on the company's most important customers which in this case are businesses. In this case the information includes a contact name associated with a specific computer, the user company's name and address, telephone number, email address, the IP address of the user's computer, the company's domain name, the user company's value and purchasing record such as the number and cost of previously purchased items. The database also includes a record of the user's previous activities on the Web site including the identity, frequency and duration of Web pages accessed and also the identity of a preferred agent by whom the user should be contacted along with any additional information connected with the user due to previous contact.

The comparison step 60 establishes that the user is either a representative of an important business user, a private user or an unknown user. If the user's computer contains a known domain name, as is the case for user 10, then the Web server requests a previously downloaded cookie to be sent from the Web browser of user 10 at step 90. This cookie will allow unique identification of the user 10 as there may be more than one associated with a large company. The use of a cookie acts as an alternative to requiring the user to enter a login name and password in order to access the Web site. The cookie also contains additional information if the user has previously been in contact with the computer 1.

If a cookie is not available, the user is asked to identify themselves at step 95 via a pop-up login screen in which they are asked for their user name and password in a conventional manner. The user name and password are entered during the original registration with the system. The user is then identified by comparison with the database records at step 100.

Although cookies are a more elegant way of accessing the system the use of a login screen may be necessary particularly if cookies are not accepted on the user's computer for example due to the presence of a "firewall".

In this example the computer hardware supplier is less interested in contacting private users than business users.

Domain names recognized by the system include those of business users in addition to other domain names representing Internet Service Providers for private users. If the user cannot be identified as either a known customer or a private user from their domain name, then the Web server presents the unidentified user with an opportunity to register with the Web site at step 75.

Registration with the Web site requires the user to enter details such as their name, their company's name and address and contact details such as telephone numbers and email addresses. The domain name and the IP address of the computer will also be logged in connection with the user for identification and contact purposes. The user will also be asked to select a password for access to the system in case a cookie is not accepted. Once the registration of the user is completed, the information is stored in the database as a new record. If insufficient registration details are provided, for example failure to provide a company name and address, then the user is treated as a private user and is passed to step 110 in FIG. 3.

If the registration is accepted, data upon the value of the new company are then obtained at step 80. This is achieved by inspection of a third party database 9 such as a stockbroker's Web site. The third party database is accessed by the computer 1 in order to establish the value of the user's company. This information is then stored in the user's record.

Following registration, the user's browser will be asked to accept a cookie from the server. The cookie will contain unique information to identify the user as is well known.

The new user is then passed to step 90 where the new user is now treated as a known user. Failure to accept cookies requires the user to log on to the system every time that the site is accessed.

Cookies can be updated each time the user accesses the site and offer a method of storing information about the user on their computer. Such information might include the number of times the Web site or pages of the site have been accessed in addition to information concerning previous sales to the user's company If the domain name reveals the user to be connected using a known Internet Service Provider designed for private users then the system assumes that the user is a private user and attempts to interrogate their computer at step 110 in FIG. 3. This is achieved by sending an applet to the user's computer. The applet contains software to analyze the user's computer and to send back information to the Web server relating to it. In the preferred example, the applet sends information to the server about the communication capabilities of the user's computer. Such information includes the user's email address and the presence of textural chat, audio or video communication software using the Internet, along with any available additional information required to initiate contact.

The second function of the applet is to provide information to the Web server computer 1 concerning how long the user has been viewing the site, including the identity of particular pages accessed. Similarly, an applet could be used in connection with the business users although in the present case similar information is derived from the business user's record and appropriate software running on the Web server computer 1. If the applet is not accepted then the private user is rejected from the queue at step 120 and can browse the Web site in a conventional manner.

Temporary records for private users in the queue are held within the memory means 4. The information within the temporary records is used by the queuing system to be described. These records contain all known information about the user derived from their IP address and the data provided from the applet. This information is stored at step 130 in FIG. 3.

The information gathered in connection with all users is used to assign a dynamic priority to the user at step 150. The assigned priority is used to position the user in a queue of users for contact by an agent representing the hardware supply company. The assignment of a priority to each user will depend upon a set of priority rules chosen by the hardware supply company. It will be appreciated that the information used and the rules themselves are likely to differ significantly between queues operated by different companies. Similarly the assigned priorities are also likely to be variable.

In this example, a numerical priority is assigned to each user in the queue as a priority number. As the user's activities upon the Web site can affect their assigned priorities, the queue is dynamically assessed. The user with the highest numerical priority will be placed at the head of the queue. Business and private users are placed within the same queue.

Figure 4A:
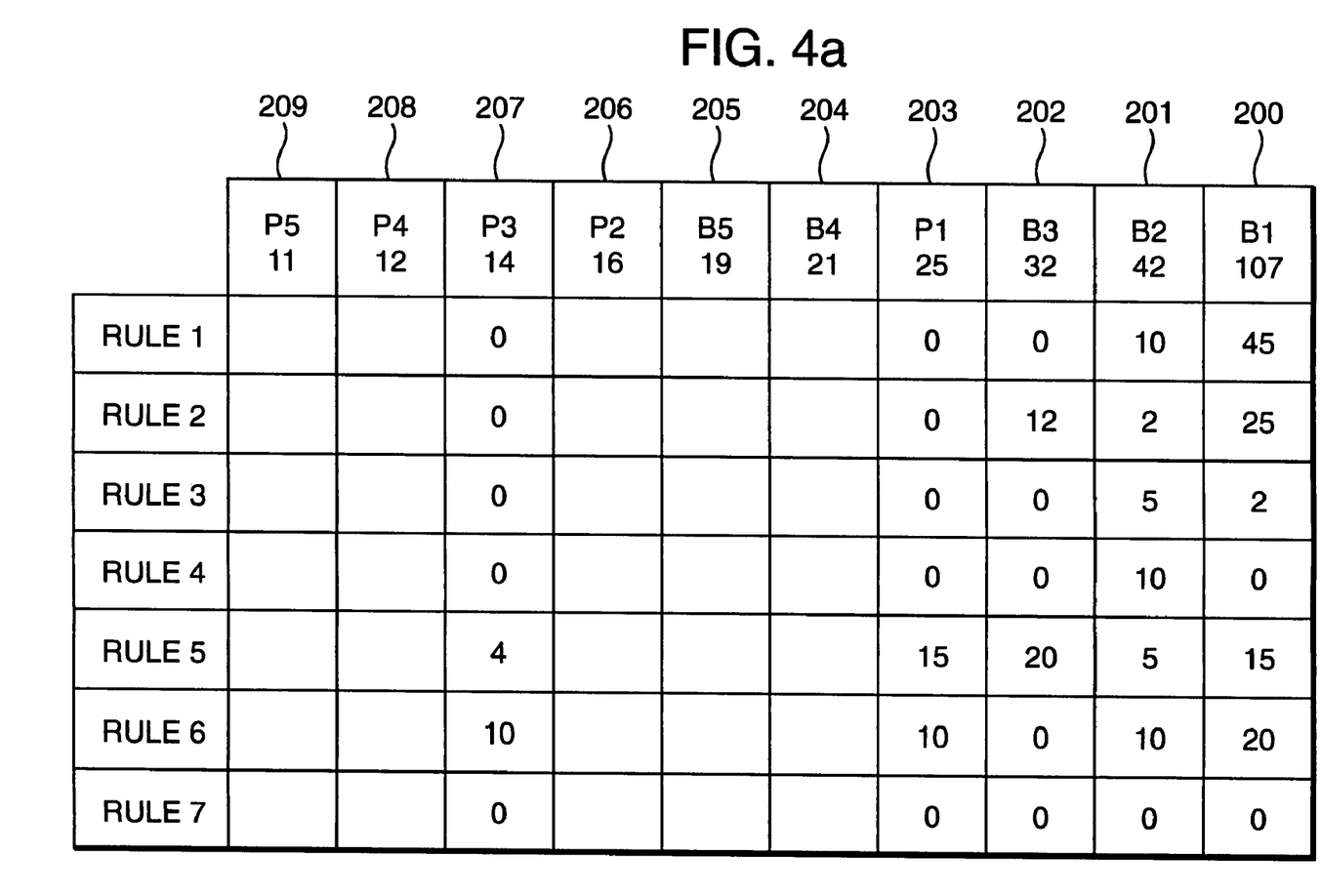
FIG. 4a shows the queuing system of the first example at a first time.
Figure 4B:
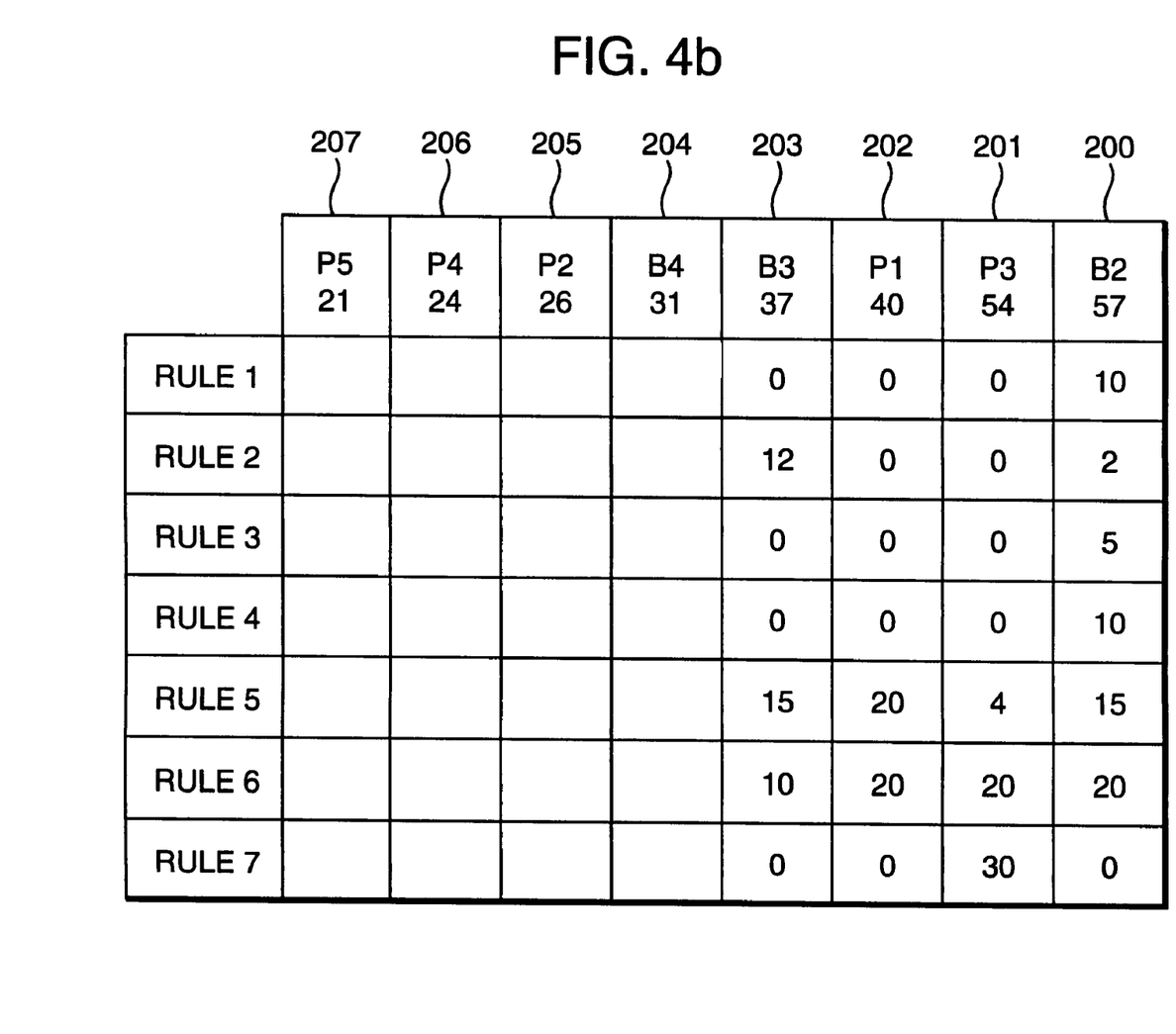
FIG. 4b shows the queuing system of the first example at a later time.

FIG. 4 shows the assessment of a user's priority based upon a number of rules. Prior to assessment by the rules, the initial assigned priority number of a user is zero. The users are assessed in connection with each of the rules below. Whereas all of the rules listed below affect business users, the priority numbers of private users are not affected by Rules 1 to 4. The priority number of a user is derived from a summation of the priority points awarded to the user as a result of being assessed by each rule.

Rule 1 concerns the value of previous sales to the business user's company. This information is contained within the database associated within one or more records connected to the company's domain name. In this case a maximum of fifty points may be assigned to the priority number, the most valued customer being awarded fifty points, a new company user being awarded one point. Alternatively, a record of the value of previous sales can be stored on the user's computer using a cookie.

Rule 2 assigns up to 30 points to the priority number based upon the value of the user's company. For example 1 point per million pounds of the company's value up to a maximum of 30 million pounds.

Whenever a known user accesses a page, information is logged in association with their specific record. Logging the time, date and identity of each page requested allows calculation of the time spent viewing specific pages and how often such pages have been accessed. This information can be used by the dynamic queuing system to prioritize users according to their perceived level of interest. It will be appreciated that the logging of this information associated with the user's activities can be achieved with appropriate software running on the Web server.

Rule 3 in the present example assigns a maximum of ten points to the user depending upon the number of times that they have accessed the Web site in the last month. For example, one point for each occasion up to a maximum of ten.

Rule 4 adds ten points if one of the product pages associated with Rule 5 below has been accessed more than three times in the past month.

Data for Rules 3 and 4 can be obtained by monitoring the activity of the user on the Web site and recording this information in the user's record. Alternatively the information can be stored on the user's computer using a cookie, the cookie being updated whenever the user accesses the site.

A priority number may also be associated with each page of product information on the Web site and accordingly when such a page is requested from the server, the user's priority number is increased. However, in the preferred example using appropriate software, the value of products contained on each of the product Web pages is calculated. This can be achieved by interaction with a third party Internet commerce tool such as Microsoft SiteServer 3.0 Commerce Edition. If the Web site allows the user to purchase products directly by adding them to an electronic "shopping basket", then another rule can be used based upon the value of the products within the shopping basket.

Rule 5 in the preferred example, assigns a maximum of twenty points to the priority number depending upon the value of products on specific Web pages. For example, a page showing information upon floppy disk drives might be allocated a priority number of five due to their low cost whereas a page showing details of the company's most expensive workstation might be allocated twenty points.

Rule 6 determines the time spent by the user accessing the Web site during the current session. The timing information can be derived from either analysis of the user's activities on the site, or for private user 12 in the present example, can be obtained from the user's computer due to the loading of an applet. Timing information can be derived in terms of the total time spent accessing the site, or times spent accessing specific pages. In this example, ten points are added to the user's priority number for every minute spent accessing the product information pages used in Rules 4 and 5.

Rule 7 increases the user's priority number by 30 points in response to the user requesting to be contacted by an agent. For example this can be achieved by clicking on the icon 425 on the desktop computers page 420 in FIG. 2.

As the activity of each user during access of the Web site can alter their associated priority, it is important to dynamically assess their priority at step 150. This can be achieved by a number of methods. In this case the priorities of each user in the queue are periodically assessed, the period in this example being every second.

Alternative methods include the reconsideration of the position of each user in the queue only when an event occurs that changes their priority. In some cases it may be less efficient to recalculate the priority numbers of all members as a faster result may be achieved by comparison of a user's priority number with one or more of their neighbors in the queue.

The order of users in the queue is therefore maintained in order of decreasing priority number from the head of the queue so that the user at the head of the queue has the highest priority and the user at the tail end, the lowest.

An example of a queue containing 10 users is shown in FIG. 4a. Box 200 denotes the head of the queue, boxes 201-209 denoting lower queue positions. Each user in the queue is identified as a business user or a private user by a letter "B" or "P" respectively and an associated number, for example B5 for business user number 5. In addition, the priority number representing the number of accumulated points is also shown in the queue box. For each user the contributory points due to the application of each rule are shown below the respective queue box.

FIG. 4a represents a specific instant in the dynamic queuing process. User B1 at the head 200 of the queue represents a valued business customer with which the hardware supply company has a long history of sales. This sales history is denoted by a 45 point award due to Rule 1. User B1 is also a large company, worth 25 million pounds and is therefore awarded 25 points due to Rule 2. This user has accessed the site twice in the past month and therefore is awarded 2 points from Rule 3 and none from Rule 4. User B1 is presently viewing a Web page showing desktop computers 420 and is therefore awarded 15 points due to Rule 5. User B1 has also been accessing the product pages for 2 minutes and is therefore awarded 20 points as a result of Rule 6. User B1 has not requested contact by an agent and therefore is not awarded any points as a result of Rule 7. A total score of 107 points is therefore awarded to user B1 which is sufficient to place them at the head of the queue in box 200.

User B2 is a smaller value company with a smaller sales record although the user's record shows that they have accessed the site 5 times in the past month and have looked at the product pages on at least 3 occasions. User B2 is currently viewing the disk drives product page 432 and has been viewing the product pages for a minute. The priority number for user B2 is therefore 42 which places them in box 201 in the queue, which is second place in the queue for service.

User B3 is a new business user and is accessing the system for the first time. Consequently Rules 1, 3 and 4 award no points but an analysis of the company's value shows it to be a medium sized company worth 12 million pounds. User B3 has been viewing the product pages for less than a minute but is currently interested in the most expensive workstations 431 and therefore has been allocated 20 points by rule 5. User B3 has the third highest priority number and is positioned third in the queue for contact 202.

A private user P1 has the fourth highest priority number and is positioned fourth in the queue 203. Although Rules 1 to 4 do not award any points to private users, the user is currently viewing a page showing desktop computers 420 and has been viewing the product pages for a minute.

Other business users B4 and B5 are shown at 204 and 205, the remaining positions 206 to 209 being occupied by private users. Private user P3 for instance has been viewing the modems and communications equipment page 433 for a minute.

FIG. 4b represents the queue at a time one minute after FIG. 4a. User B1, has now been removed from the head of the queue and has been passed to a specific agent 21 who is the preferred contact agent for user B1. User B2 is now at the head of the queue due to having the highest priority number. User B2 is now looking at the desktop computer page 420 worth 15 points and has now been looking at the product pages for 2 minutes. The priority number of user B2 is now 57 points.

In the minute between the times denoted by FIGS. 4a and 4b, the user P3 has requested to be contacted by an agent for example by accessing the icon 425. Thirty points are added as a result of this request giving the user P3 the second highest priority number of 54 points and a position at box 201 in the queue. The priority number of user P1 has now increased to 40 points due to their viewing of the product pages for 2 minutes and their interest in the highest value workstations 431 (worth 20 points). User P1 therefore attains a higher priority than business user B3 as user B3 has lost interest in the high value workstations 431 and is now viewing desktop computers 420 worth 15 points. User P1 now occupies box 202 and B3 occupies 203.

User B5 has now disconnected from the system and is therefore no longer in the queue. No other users have joined and therefore the queue is 2 places shorter than in FIG. 4a.

A user is removed from the queue after they have reached the head and are being handled by an agent. Alternatively they are removed if they disconnect from the system or if no activity is detected from the user over a period of time, for example five minutes. On removal of a user from the queue, the other users in the queue will be reallocated positions accordingly.

The structure of the queue shown in FIGS. 4a and 4b is held within the memory means 4 of the Web server computer 1, as is the identity of each user in the queue.

When a user reaches the head of the queue, the Web server computer 1 assigns one of a number of agents to contact the user at step 160 in FIG. 3. The agents are connected to the Web server with the agent connection means 6. In this example the agents communicate with computer 1 using personal computers 20-23 and the computer 1 recognizes each agent by their associated computer.

When a user reaches the head of the queue, the computer analyses the relevant database or memory record for business and private users respectively. If the user represents a business and has been contacted by a particular agent on a previous occasion, the computer may choose to instruct the particular agent to contact the user as is the case here for user B1 in FIG. 4a. Alternatively the computer 1 may choose another user if the agent of choice is busy for a long period. Similarly, specific agents may be assigned to deal solely with private users. Some agents may also have specific areas of expertise which can be matched to the needs of the user. For example agent operating computer 22 may be an expert on workstations and this expertise may be known to computer 1 allowing users interested in workstations to be passed to this agent for contact. After the information relating to a user at the head of the queue has been passed to an agent, they are removed from the queue. The agent is provided with all of the information relating to the user in the database or computer memory. The agent then initiates a call to the user using the contact information available.

The call to the user may be made by a number of means and in the case of business users, the preferred means of contact is determined as part of the site registration. Examples of contact methods include a telephone connection via a PSTN, Internet based voice or video connection, email or textural chat. In the case of textural chat the initial contact can be made automatically at a calculated time prior to connection with the human agent as such an automated welcome reduces the time spent by an agent dealing with each user. An example of such an automated message is: "Good <morning/afternoon><user's registered name>. Welcome to <business name>. I see that you are looking at <name of product/type of product on current Web page>. Can I help you with any further information on <this/these> products?"

Similarly the dialing of the user's telephone number could be automated in a predictive manner.

The agent will deal with the user in a conventional manner, for example answering queries and attempting to sell the products to the user. For business users, the agent's computer for example computer 21 in the case of user B1, will record the identity of the agent on the user's record which allows the user B1 to be directed to the same agent on subsequent occasions. This information can also be recorded in a cookie sent to the business user's computer. Other information such as the duration of the call and details of information sent to or provided by the user can similarly be recorded on the business user's record.

On completion of the call, the agent disconnects contact with the current user and prepares to deal with the next user. Typically, any private user's record held temporarily in the memory 4 will be erased.

The above-described embodiment is illustrative of the principles of the present invention. Other embodiments could be devised by those skilled in the art without departing from the spirit and scope of the present invention.

What is claimed is:

1. A method executing on hardware of establishing communication between an information source defined by a data processing system and a user accessing the information source with a data processing device via a communications network, the method comprising
    assigning a position in a queue to the user according to one or more rules;
    determining contact information relating to the user which enables an agent to contact the user; and
    establishing communication between an agent and the user at the head of the queue using the contact information;
    characterized in that
    at least one rule relates to the use of the information source by the user, the method further comprising monitoring the interaction of the user with the information source, one or more of the rules using the monitored interaction with the information source to assign a position in the queue to the user, wherein the information source is a Web server and the user accesses the information source using a Web browser.

2. A method according to claim 1 further comprising monitoring information received from the user, one or more of the rules using the information received from the user to assign a position in the queue to the user.

3. A method according to claim 1 wherein the monitored interaction with the information source includes one or more of, the time spent by the user accessing the information source, how frequently the user has accessed the information source, and specific information accessed by the user.

4. A method according to claim 1 further comprising monitoring the usage of the information source by the user, and reordering the queue so as to be in accordance with the rules.

5. A method according to claim 1 wherein the communications network is a WAN, LAN, PSTN or the Internet.

6. A method according to claim 5 wherein the contact information is in the form of a telephone number, WAN address, LAN address, email address or TCP/IP address.

7. A method according to claim 6 wherein the user provides the contact information to the information source prior to accessing the information source.

8. A method according to claim 1 wherein instruction data are transferred from the Web server to the data processing device of the user and wherein the instruction data instruct the data processing device to provide contact or monitoring information to the information source.

9. A method according to claim 8, wherein the instruction data are in the form of an applet.

10. A method according to claim 1 wherein information used by at least one of the rules is communicated between the Web server and the Web browser in the form of a cookie.

11. A method according to claim 1 wherein the contact information is used to establish communication between the agent and the user while the user continues to access the information source.

12. A method according to claim 1 wherein communication is established between the agent and the user via a PSTN, WAN, LAN, email address or TCP/IP address.

13. A hardware apparatus for monitoring the operation of an information source defined by a data processing system, the hardware apparatus comprising
    means for detecting the access of the information source by a user, the user accessing the information source via a communications network using a data processing device;
    means for allocating a position in a queue to the user according to one or more rules; and means for identifying to an agent contact information relating to a user at the head of the queue, enabling the agent to communicate with the user;
    characterized in that
    the means for allocating a position in the queue to a user further comprises monitoring means to monitor the interaction of the user with the information source, one or more of the rules using the monitored information to assign a position in the queue to the user, and wherein the data processing system is a Web server.

14. The hardware apparatus according to claim 13 wherein the means for allocating a position in the queue to a user further comprises means to monitor information received from the user, one or more of the rules using the information received from the user to assign a position in the queue to the user.

15. The hardware apparatus according to claim 13 further comprising usage monitoring means to monitor the use of the information source and reorder the queue to as to be in accordance with the rules.

16. The hardware apparatus according to claim 13 wherein the communications network is a WAN, LAN, PSTN, or the Internet.

* * * * *

UNITED STATES PATENT AND TRADEMARK OFFICE
CERTIFICATE OF CORRECTION

PATENT NO. : 7,620,722 B1  Page 1 of 1
APPLICATION NO. : 10/069685
DATED : November 17, 2009
INVENTOR(S) : Ketan Ruparel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1678 days.

Signed and Sealed this

Fourteenth Day of December, 2010

David J. Kappos
*Director of the United States Patent and Trademark Office*